US008566700B2

(12) United States Patent
Ueda

(10) Patent No.: US 8,566,700 B2
(45) Date of Patent: Oct. 22, 2013

(54) DISPLAYING ANNOTATION WITH A DOCUMENT IMAGE

(75) Inventor: Masami Ueda, Fujimino (JP)

(73) Assignee: Canon Kabushiki Kaisha, Tokyo (JP)

(*) Notice: Subject to any disclaimer, the term of this patent is extended or adjusted under 35 U.S.C. 154(b) by 288 days.

(21) Appl. No.: 12/401,229

(22) Filed: Mar. 10, 2009

(65) Prior Publication Data

US 2009/0235155 A1    Sep. 17, 2009

(30) Foreign Application Priority Data

Mar. 14, 2008    (JP) ................................ 2008-066201

(51) Int. Cl.
*G06F 17/24*    (2006.01)
*G06F 17/21*    (2006.01)

(52) U.S. Cl.
USPC ............ 715/232; 715/230; 715/243; 715/244

(58) Field of Classification Search
USPC ........................................................ 715/233
See application file for complete search history.

(56) References Cited

U.S. PATENT DOCUMENTS

| | | | | |
|---|---|---|---|---|
| 5,146,552 | A | * | 9/1992 | Cassorla et al. ............... 715/234 |
| 5,581,682 | A | * | 12/1996 | Anderson et al. ............. 715/236 |
| 7,703,001 | B2 | * | 4/2010 | Takaai et al. .................. 715/232 |
| 2003/0051214 | A1 | * | 3/2003 | Graham et al. ................ 715/512 |
| 2003/0070139 | A1 | * | 4/2003 | Marshall et al. .............. 715/512 |
| 2004/0216032 | A1 | * | 10/2004 | Amitay et al. ................. 715/500 |
| 2005/0091578 | A1 | * | 4/2005 | Madan et al. .................. 715/512 |
| 2005/0268220 | A1 | | 12/2005 | Tanaka ........................... 715/512 |
| 2007/0078886 | A1 | * | 4/2007 | Rivette et al. ................. 715/765 |
| 2007/0094611 | A1 | | 4/2007 | Sasaki | |
| 2007/0294614 | A1 | * | 12/2007 | Jacquin et al. ................ 715/512 |
| 2008/0059238 | A1 | * | 3/2008 | Park et al. ......................... 705/3 |

FOREIGN PATENT DOCUMENTS

| | | |
|---|---|---|
| JP | 4102133 A | 4/1992 |
| JP | 2000339327 A | 12/2000 |
| JP | 2004259019 A | 9/2004 |
| JP | 2004287559 A | 10/2004 |
| JP | 2005-339005 | 12/2005 |
| JP | 2006-350554 | 12/2006 |
| JP | 2007115180 A | 5/2007 |
| JP | 2008027243 A | 2/2008 |

OTHER PUBLICATIONS

Japanese Office Action dated Feb. 2, 2010 in corresponding Japanese Application No. 2008-066201, and English language translation thereof.

* cited by examiner

*Primary Examiner* — Stephen Hong
*Assistant Examiner* — Keith Bloomquist
(74) *Attorney, Agent, or Firm* — Fitzpatrick, Cella, Harper & Scinto

(57) ABSTRACT

A client terminal acquires from a server terminal one or more document information which includes at least a thumbnail image and document identification information for identifying document data corresponding to the thumbnail image, and includes first annotation data and/or second annotation data associated with the document identification information. If first annotation data is included in respective acquired document information, the client terminal displays a thumbnail image with which the first annotation data is combined, as a list with thumbnail view, on a display unit. If the second annotation data is included in specified document data, the client terminal individually displays specified document data with which the second annotation data is combined, on a display unit.

14 Claims, 18 Drawing Sheets

FIG. 6
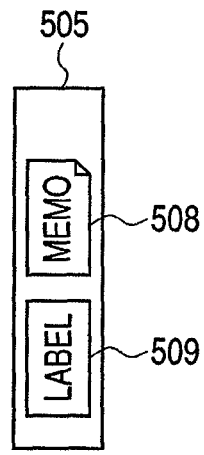
FIG. 7
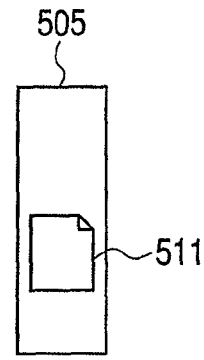
FIG. 8
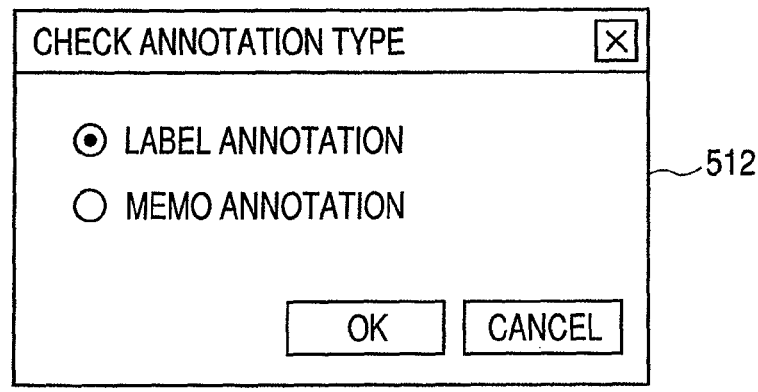
FIG. 9
DOCUMENT TABLE
601
| DOCUMENT ID | DOCUMENT NAME | DOCUMENT TYPE | THE NUMBER OF PAGES |
|---|---|---|---|
| 00001 | PURCHASE ORDER A | APPLICATION | N/A |
| 00002 | PURCHASE ORDER B | IMAGE | 2 |
| 00003 | PURCHASE ORDER C | IMAGE | 2 |
| 00004 | PURCHASE ORDER D | IMAGE | 4 |
| 00005 | PURCHASE ORDER E | IMAGE | 1 |

FIG. 10

THUMBNAIL TABLE 602

| THUMBNAIL ID | DOCUMENT ID | PAGE ID | THUMBNAIL DATA |
|---|---|---|---|
| 00001 | 00002 | 00001 | ###### |
| 00002 | 00002 | 00002 | ###### |
| 00003 | 00003 | 00001 | ###### |
| 00004 | 00003 | 00002 | ###### |
| 00005 | 00004 | 00001 | ###### |
| 00006 | 00004 | 00002 | ###### |
| 00007 | 00004 | 00003 | ###### |
| 00008 | 00004 | 00004 | ###### |
| 00009 | 00005 | 00001 | ###### |

FIG. 11

ANNOTATION TABLE 603

| ANNOTATION ID | DOCUMENT ID | PAGE ID | ANNOTATION CHARACTER STRING | ANNOTATION TYPE | COORDINATES OF ANNOTATION |
|---|---|---|---|---|---|
| 00001 | 00002 | 1 | IMPORTANT | LABEL ANNOTATION | (100,100), (300,200) |
| 00002 | 00002 | 3 | DELIVERY DATE IS DECEMBER 1ST | MEMO ANNOTATION | (100,250), (300,350) |
| 00003 | 00003 | 5 | STOCK IS OUT, AND DELIVERY DATE IS BEING CHECKED | MEMO ANNOTATION | (100,100), (300,300) |

FIG. 20

ANNOTATION TABLE
603

| ANNOTATION ID | DOCUMENT ID | PAGE ID | ANNOTATION CHARACTER STRING | ANNOTATION TYPE | COORDINATES OF ANNOTATION |
|---|---|---|---|---|---|
| 00001 | 00003 | 1 | DELIVERY DATE NEEDS TO BE CHECKED | LABEL ANNOTATION | (10,10), (500,500) |

FIG. 21

ANNOTATION TABLE
603

| ANNOTATION ID | DOCUMENT ID | PAGE ID | ANNOTATION CHARACTER STRING | ANNOTATION TYPE | COORDINATES OF ANNOTATION |
|---|---|---|---|---|---|
| 00001 | 00002 | 1 | IMPORTANT | LABEL ANNOTATION | (100,100), (300,200) |
| 00002 | 00002 | 3 | DELIVERY DATE IS DECEMBER 1ST | MEMO ANNOTATION | (100,250), (300,350) |
| 00003 | 00003 | 5 | STOCK IS OUT, AND DELIVERY DATE IS BEING CHECKED | MEMO ANNOTATION | (100,100), (300,300) |
| 00004 | 00003 | 1 | DELIVERY DATE NEEDS TO BE CHECKED | LABEL ANNOTATION | (10,10), (500,500) |

FIG. 22
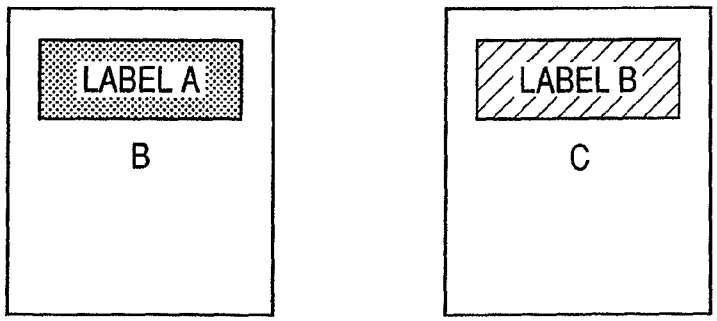
FIG. 23
ANNOTATION TABLE
603
| ANNOTATION ID | DOCUMENT ID | PAGE ID | ANNOTATION CHARACTER STRING | ANNOTATION TYPE | COORDINATES OF ANNOTATION |
|---|---|---|---|---|---|
| 00001 | 00002 | 1 | LABEL A | LABEL ANNOTATION | (100,100), (300,200) |
| 00002 | 00003 | 1 | LABEL B | LABEL ANNOTATION | (100,100), (300,200) |
FIG. 24
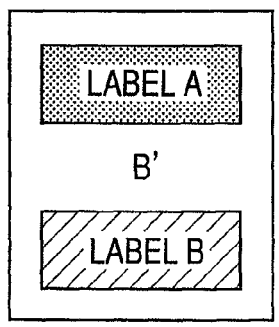

ANNOTATION TABLE 603

| ANNOTATION ID | DOCUMENT ID | PAGE ID | ANNOTATION CHARACTER STRING | ANNOTATION TYPE | COORDINATES OF ANNOTATION |
|---|---|---|---|---|---|
| 00001 | 00002 | 1 | LABEL A | LABEL ANNOTATION | (100,100), (500,300) |
| 00002 | 00002 | 1 | LABEL B | LABEL ANNOTATION | (100,350), (500,550) |

DOCUMENT TABLE 601

| DOCUMENT ID | DOCUMENT NAME | DOCUMENT TYPE | THE NUMBER OF PAGES |
|---|---|---|---|
| 00001 | PURCHASE ORDER A | APPLICATION | N/A |
| 00002 | D | IMAGE | 4 |

ANNOTATION TABLE 603

| ANNOTATION ID | DOCUMENT ID | PAGE ID | ANNOTATION CHARACTER STRING | ANNOTATION TYPE | COORDINATES OF ANNOTATION |
|---|---|---|---|---|---|
| 00001 | 00004 | 1 | LABEL A | LABEL ANNOTATION | (100,100), (500,300) |
| 00002 | 00004 | 1 | LABEL B | LABEL ANNOTATION | (100,350), (500,550) |

DOCUMENT TABLE 601

| DOCUMENT ID | DOCUMENT NAME | DOCUMENT TYPE | THE NUMBER OF PAGES |
|---|---|---|---|
| 00001 | PURCHASE ORDER A | APPLICATION | N/A |
| 00002 | D | IMAGE | 2 |
| 00003 | D2 | IMAGE | 2 |

FIG. 31  ANNOTATION TABLE 603

| ANNOTATION ID | DOCUMENT ID | PAGE ID | ANNOTATION CHARACTER STRING | ANNOTATION TYPE | COORDINATES OF ANNOTATION |
|---|---|---|---|---|---|
| 00001 | 00004 | 1 | LABEL A | LABEL ANNOTATION | (100,100), (500,300) |
| 00002 | 00004 | 1 | LABEL B | LABEL ANNOTATION | (100,350), (500,550) |
| 00003 | 00005 | 1 | LABEL A | LABEL ANNOTATION | (100,100), (500,300) |
| 00004 | 00005 | 1 | LABEL B | LABEL ANNOTATION | (100,350), (500,550) |

DISPLAYING ANNOTATION WITH A DOCUMENT IMAGE

BACKGROUND OF THE INVENTION

1. Field of the Invention

The present invention relates to a document management system or the like in which an information processor is communicably connected with a server apparatus which manages document data, a thumbnail image of the document data, and annotation data to be combined with the thumbnail image.

In recent years, there is a need to improve operational efficiencies in various companies. As such, documents are often digitized. Additionally, the price of storage medium (disk) has been reduced. Thus, there are a large amount of documents to be searched. How fast to retrieve a target document from many documents to be searched and which document is processed first significantly affect operational speeds.

In such circumstances, as for operation of receiving and placing orders through a fax (facsimile apparatus), an order slip received by the fax is digitized and stored in document management software. Response operation is performed to notify a customer of a delivery date and the like with respect to the received order slip. In this operation, the document is annotated such that additional information including the delivery date is added to and stored in the document, and the document is sent back to the customer.

Such annotation is used in various applications. For example, an annotation is used as a delivery date sent in response to a recipient, and a memo added by an operator who performs response operation.

2. Description of the Related Art

Accordingly, as the number of annotations in a document increases, it is more difficult to identify an important annotation among them. Japanese Patent Application Laid-Open No. 2005-339005 discloses a technique which allows an annotation to be easily identified by switching display/non-display of annotations added by other users. Japanese Patent Application Laid-Open No. 2006-350554 discloses a technique in which an annotation that should be noted can be easily determined from among annotations added to a digitized document.

However, the above described techniques make it easy to distinguish an annotation added to a document only when the document is opened. Therefore, in the above described techniques, if there are many documents to be handled, for example, during operation of receiving and placing orders through a fax, documents need to be opened one by one to check an annotation. This causes difficulties in the operation. In addition, if an annotation to be sent to a recipient (customer) and an annotation added as a memo by an operator are pasted in a mixed manner on a document, it is troublesome to delete some of the annotations when the document is faxed to the recipient or is sent as a file attached to an e-mail.

An object of the present invention is to provide a mechanism which allows a document to be easily checked and improves operating efficiency.

SUMMARY OF THE INVENTION

To solve the above described problems, the present invention provides an information processor which displays a thumbnail image of document data, the information processor including: a document data selecting unit that selects the document data; an annotation data selecting unit that selects first annotation data to be displayed in the thumbnail image of the selected document data or second annotation data to be displayed in the document data; an annotation data adding unit that adds the selected annotation data to the document data; and a display unit that displays the thumbnail image of the document data to which the annotation data is added, wherein the display unit displays the thumbnail image with which the annotation data is combined, the annotation data having being added as the first annotation data among the annotation data added to the document data. A user of the information processor of this first aspect of the present invention can easily check the level of importance of a document, thereby increasing operating efficiency.

Further features of the present invention will become apparent from the following description of exemplary embodiments with reference to the attached drawings.

BRIEF DESCRIPTION OF THE DRAWINGS

FIG. 6 is a diagram illustrating one example of an annotation tool 505 of the document viewer 308.

FIG. 7 is a diagram illustrating one example of the annotation tool 505 of the document viewer 308.

FIG. 8 is a diagram illustrating one example of a dialog box 512 for checking a type of annotation.

FIG. 9 is a diagram illustrating one example of a document table 601.

FIG. 10 is a diagram illustrating one example of a thumbnail table 602.

FIG. 11 is a diagram illustrating one example of an annotation table 603.

FIG. 20 is a diagram illustrating one example of an annotation table 603 which is stored in a RAM 203 of a client terminal 101.

FIG. 21 is a diagram illustrating one example of the annotation table 603 of a server terminal 102 in which information is updated by annotation adding processing.

FIG. 22 is a diagram illustrating one example of annotations added to documents to be merged.

FIG. 23 is a diagram illustrating one example of the annotation table 603 of annotations added to documents to be merged.

FIG. 24 is a diagram illustrating one example of annotations added to merged documents.

FIG. 31 is a diagram illustrating one example of the annotation table 603 after the division of the document.

DESCRIPTION OF THE EMBODIMENTS

Hereinafter, exemplary embodiments of a document management system according to the present invention will be described with reference to the accompanying drawings.

Figure 1:
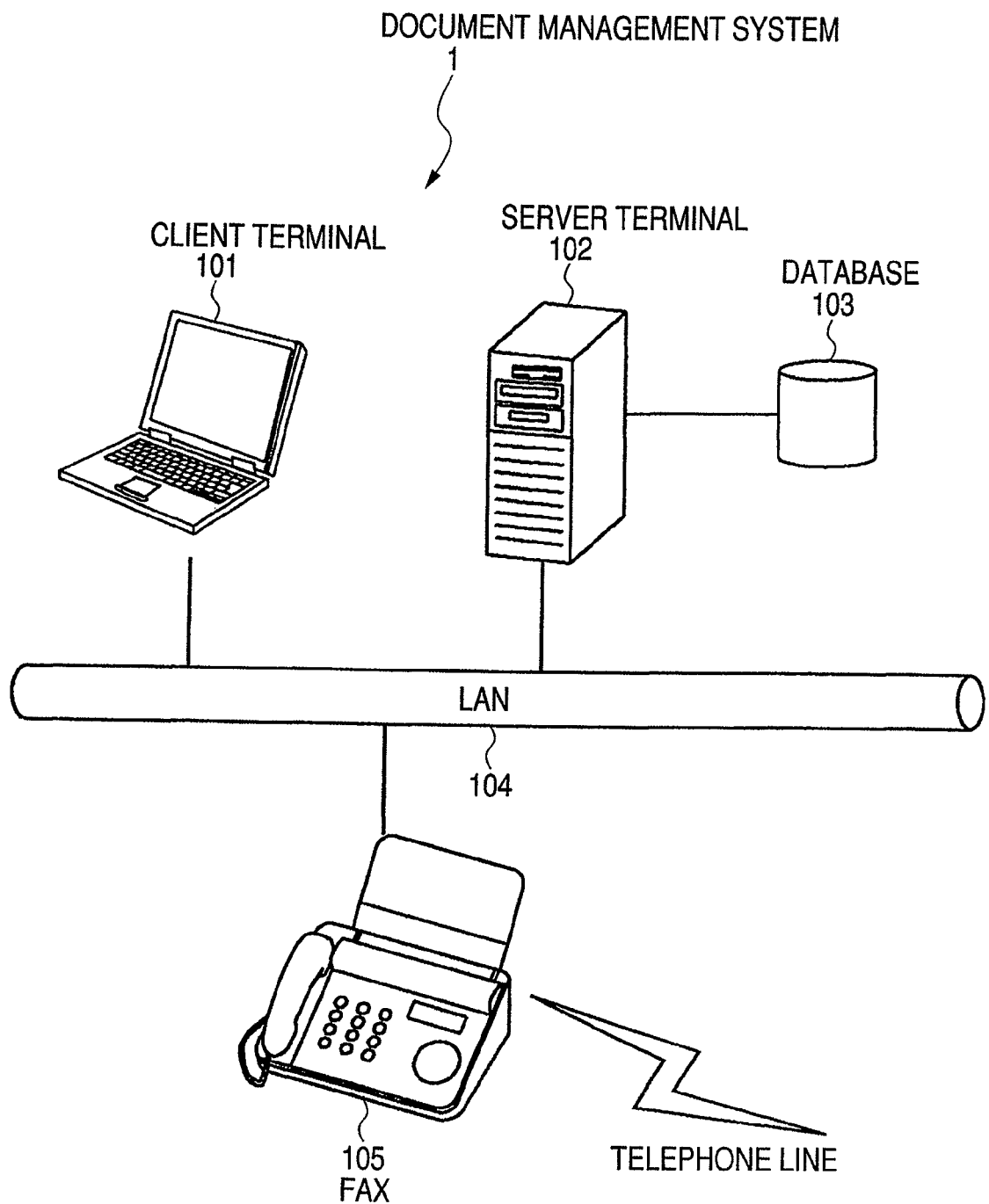
FIG. 1 is a diagram illustrating a configuration of a document management system 1 according to an embodiment of the present invention.

FIG. 1 is a diagram illustrating a configuration of a document management system 1 according to an embodiment of the present invention.

In the document management system 1, a client terminal (information processor) 101, a server terminal (server apparatus) 102, and a fax 105 are communicably connected through a LAN 104. The server terminal 102 is connected to a database (storage unit) 103 in which a thumbnail image is registered. Such a thumbnail image is used when image data and document data acquired from the fax 105, a scanner (not shown) or the client terminal 101 are displayed in thumbnail view on the client terminal 101. Alternatively, a registered document (registered document data) and a thumbnail image may be registered in a storage unit different from the server terminal 102.

The client terminal 101 displays a registered document and a thumbnail image. The server terminal 102 sends a registered document and a thumbnail image to the client terminal 101 on the request of the client terminal 101, to perform various processing such as merging documents and dividing document. Further, the server terminal 102 and the database 103 retain management information for managing registered documents and thumbnail images. A plurality of the client terminals 102 may be included in the document management system 1.

The fax 105 is communicably connected to a fax of an external network such as of a customer through a telephone line, and sends a received fax image to the server terminal 102 and registers document data therein.

Each of the terminals has function units to implement the present invention.

The client terminal 101 includes a data communication function unit that sends and receives data to and from the server terminal 102, a display function unit that displays a registered document and a thumbnail image which are acquired by the data communication function unit, and a document editing function unit that performs addition of an annotation image (hereinafter referred to as "annotation"), merging of documents, and dividing of a document.

The server terminal 102 includes a registration function unit (not shown) that registers, in a storage unit, document data and a thumbnail image of a registered document which are acquired from the client terminal 101, the fax 105 or the like, a management function unit that manages a registered document, a thumbnail image, and an annotation, and a server-side communication function unit which sends and receives data to and from the client terminal 101. These function units operate so as to implement the present invention.

The server terminal 102 will now be described in detail.

Figure 2:
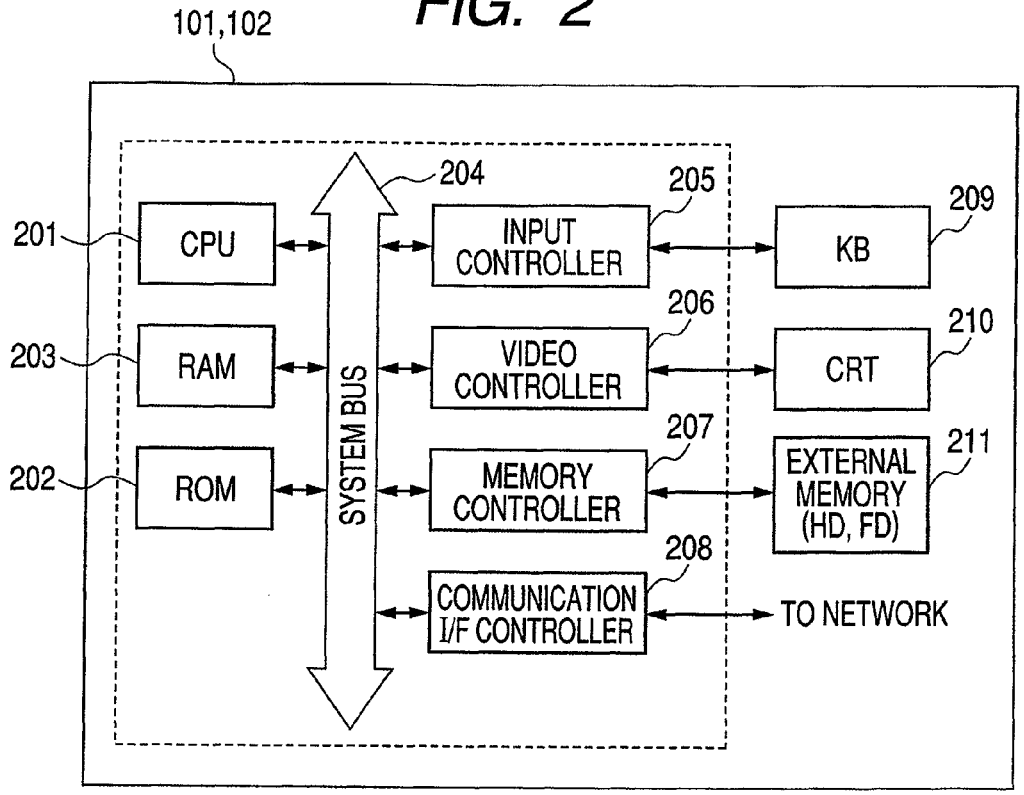
FIG. 2 is a diagram illustrating a hardware configuration of a server terminal 102.

FIG. 2 is a diagram illustrating the hardware configuration of the server terminal 102. The hardware configuration of the client terminal 101 is the same as that of the server terminal 102. Therefore, only the hardware configuration of the server terminal 102 will be described, and description of the hardware configuration of the client terminal 101 will be omitted.

In the server terminal 102, a CPU (Central Processing Unit) 201, a RAM (Random Access Memory) 203, a ROM (Read Only Memory) 202, an input controller 205, a video controller 206, a memory controller 207, and a communication interface (hereinafter referred to as I/F) controller 208 are connected through a system bus 204.

The CPU 201 centrally controls devices and controllers which are connected to the system bus 204.

The ROM 202 or the external memory 211 stores various programs necessary for implementing functions to be executed by the server terminal 102, the client terminal 101 or the like, such as a BIOS (Basic Input/Output System), an operating system (hereinafter referred to as an OS), and a document management application. The BIOS is a control program of the CPU 201.

The RAM 203 functions as a main memory, a work area and the like of the CPU 201. The CPU 201 loads programs necessary for execution of processing into the RAM 203 and executes the programs so as to implement various operations.

The input controller 205 controls input from pointing devices such as a keyboard 209 and a mouse (not shown).

The video controller 206 controls display on a display device such as a CRT (Cathode Ray Tube) 210. The display device may be a liquid crystal display instead of the CRT. The above described controllers are used by an administrator as necessary, and do not have a direct implication on the present invention.

The memory controller 207 controls access to a hard disk (HD), a floppy (R) disk (FD), or the external memory 211 such as a compact flash (R) memory. In the hard disk or floppy disk, a boot program, browser software, various applications, font data, a user file, an edited file, various data, etc. are stored. The external memory is connected via an adapter to a PCMCIA (Personal Computer Memory Card International Association) card slot.

The communication I/F controller 208 connects and communicates with an external apparatus through a network, and performs network communication control processing. For example, the communication I/F controller 208 allows internet communication using TCP/IP (Transmission Control Protocol/Internet Protocol).

The CPU 201 performs processing of deploying (rasterizing) an outline font into a display information area in the RAM 203 so that the outline font can be displayed on the CRT 210. In addition, the CPU 201 allows a user to give instruction using a mouse cursor (not shown) on the CRT 210.

In the external memory 211, the document management application for the document management system 1 and data used in the document management application are recorded, and the document management application and the data are loaded into the RAM 202 to be executed by the CPU 201 as required.

The external memory 211 may include the database 103.

A user interface of the document management application will be described with reference to FIGS. 3 to 8.

Figure 3:
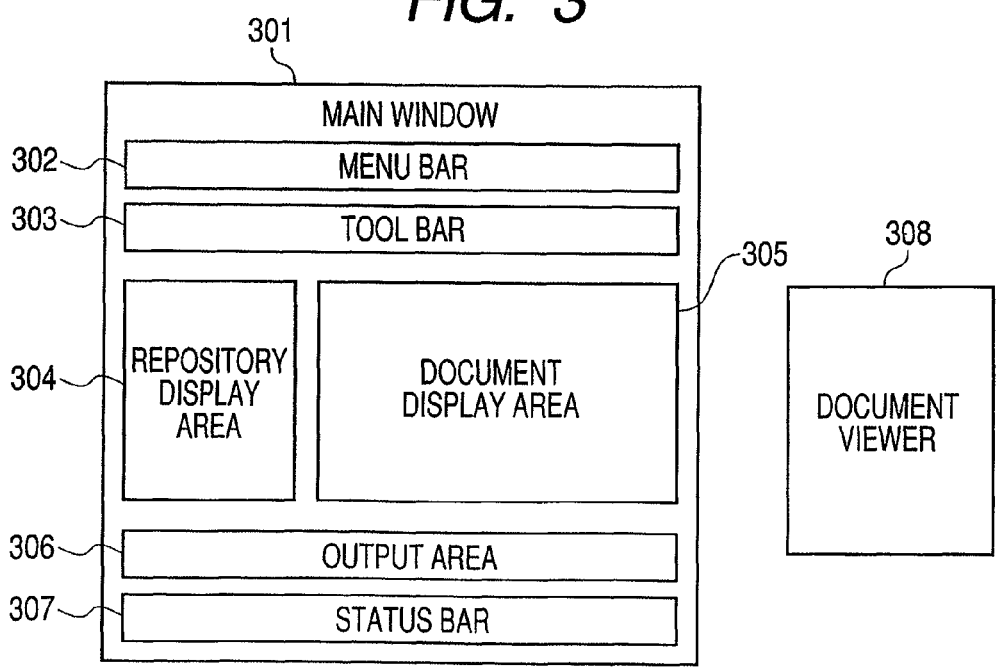
FIG. 3 is a diagram illustrating one example of a user interface of a main window 301 of the document management system 1.
Figure 4:
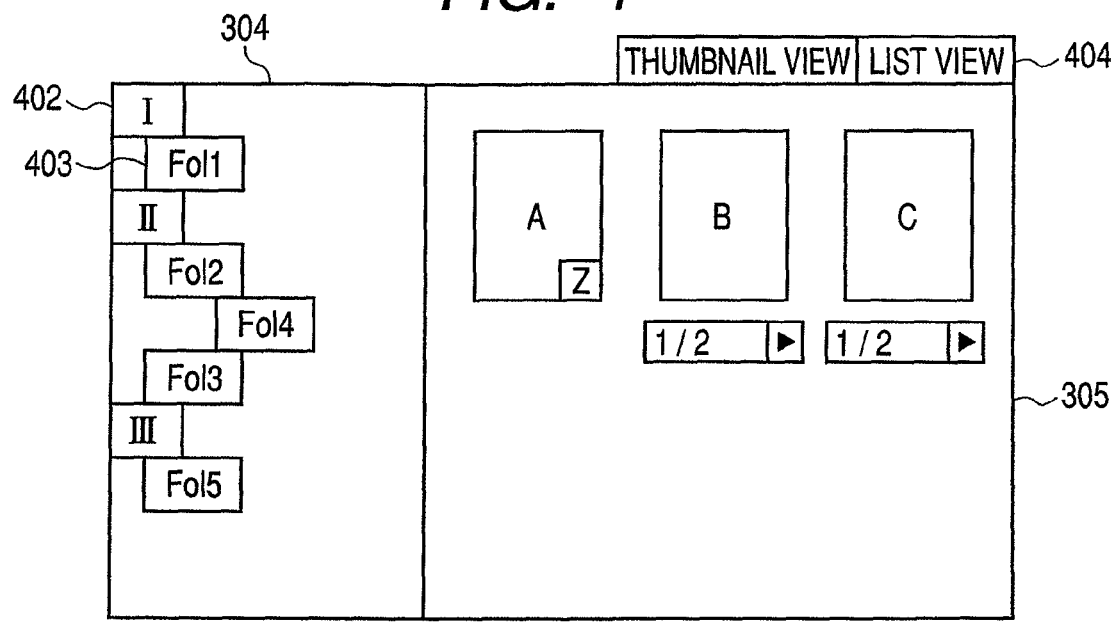
FIG. 4 is a diagram illustrating one example of a repository display area 304 and a document display area of the main window 301 of the document management system 1.
Figure 5:
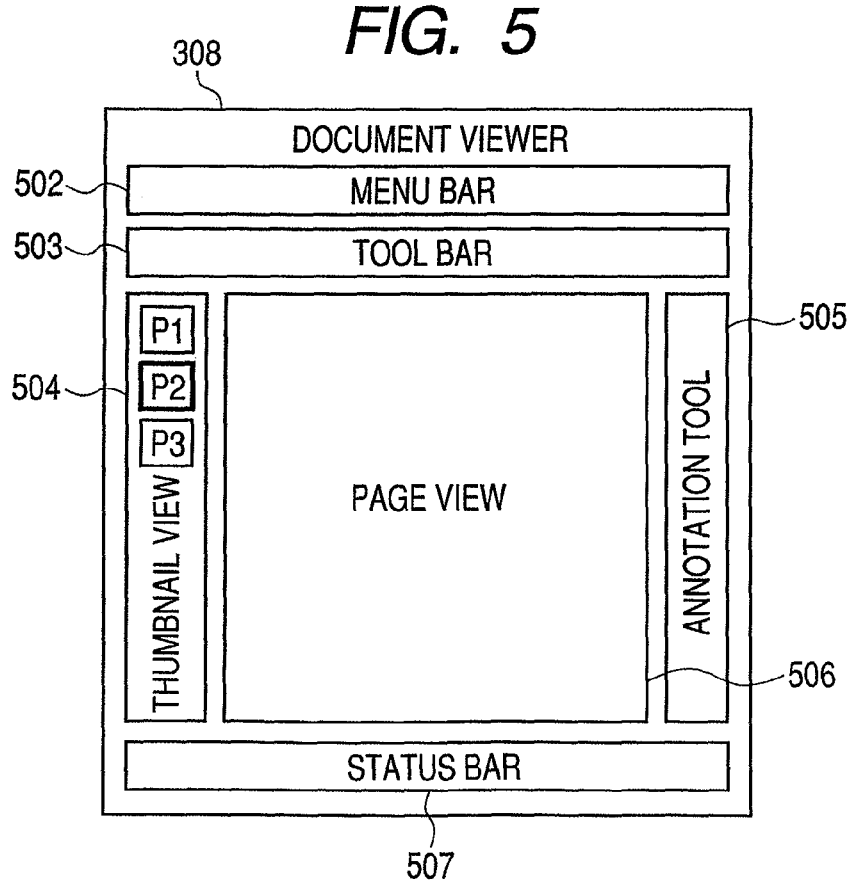
FIG. 5 is a diagram illustrating one example of a document viewer 308 of the main window 301 of the document management system 1.

FIG. 3 is a diagram illustrating one example of a user interface of a main window 301 of the document management system 1; FIG. 4 is a diagram illustrating one example of a repository display area 304 and a document display area of the main window 301; FIG. 5 is a diagram illustrating one example of a document viewer 308 of the main window 301 of the document management system 1; FIG. 6 is a diagram illustrating one example of an annotation tool 505 of the document viewer 308; FIG. 7 is a diagram illustrating one example of the annotation tool 505 of the document viewer 308; and FIG. 8 is a diagram illustrating one example of a dialog box 512 for checking a type of annotation.

As shown in FIG. 3, a document management application executed by the client terminal 101 of the document management system 1 includes the main window 301 and the document viewer 308.

The main window 301 is a window for operating a file stored in the database 103.

The document viewer 308 is an image viewer for displaying an image stored in the main window 301. Application data stored in the main window 301 is handled by each corresponding application.

The main window 301 has the menu bar 302, the tool bar 303, the repository display area 304, the document display area 305, the output area 306, the status bar 307, etc.

The menu bar 302 is a standard menu operation area of an OS (e.g., Windows (R)) to start up functions.

In the tool bar 303, distinctive functions of the menu bar 302 are displayed as "tool buttons".

The repository display area 304 is a tree view in which a cabinet structure and a folder structure in the database used by the document management application are displayed.

The document display area 305 is an area in which a document selected in the repository display area 304 is displayed in a thumbnail mode or a list mode.

The output area 306 is an area in which a printer icon and other applications are registered. When a document displayed in the document display area 305 is dropped onto an icon displayed in the output area 306, the document is printed by a printer or opened by a corresponding application.

The status bar 307 is a standard status bar of the OS. A cabinet is an independent unit of document management, and specifically is a storage unit in which folders created by a user are held together. The database is managed with respect to each cabinet.

The user can add and delete various document and image files to and from the repository display area 304 or the document display area 305 through the input controller 205 of the client terminal 101. In this way, the user can edit the database used by the document management application.

In addition, the user can add and change various files in a folder, and also can add and delete a cabinet and a folder.

As shown in FIG. 4, in the repository display area 304 of the main window 301 of the document management application, a registered document is displayed as a virtual folder in a folder format. In the document display area 305, a thumbnail image of a document is displayed.

The repository area 304 displays a tree view of cabinets and folders.

The button 402 represents a cabinet, and a button 403 represents a folder. A maximum unit in which documents are stored is a cabinet, and a certain number of folders can be created in the cabinet.

A button 404 is a part of the tool bar 303, and is used for selecting one of a thumbnail format and a list format in which a folder or document object is displayed in the document display area 305. This selection allows switching from a thumbnail-format display mode to a list-format display mode (display mode switching).

In this example, three documents A, B, C in a cabinet "I-Fol1" are displayed in the thumbnail format in the document display area 305.

The document A is an application document. In this example, a corresponding application icon (icon "Z") is displayed in the bottom right of a thumbnail image of the first page acquired from application data.

The documents B and C are image documents. An arrow displayed at the bottom of a thumbnail image of an image document represents page turning. When the arrow is changed on the thumbnail image, a thumbnail image of a corresponding page is displayed.

When an object of an image document displayed in the document display area 305 is opened, the document viewer 308 shown in FIG. 5 displays an image of the registered document (the registered image).

In FIG. 5, a menu bar 502 is a standard menu operation area of the OS to start up functions.

In a tool bar 503, distinctive functions of the menu bar 502 are displayed as "tool buttons".

A thumbnail view 504 is an area in which a thumbnail image of a registered document being viewed is displayed in units of pages. A thumbnail image displayed here is the same as a thumbnail image displayed in the document display area 305.

The annotation tool 505 is a tool bar used when an annotation is added to a document.

As shown in FIG. 6, the annotation tool 505 includes two icons: a memo annotation icon 508 and a label annotation icon 509. In the present invention, two annotations: a memo annotation (a second annotation image (annotation data)) and a label annotation (a first annotation image (annotation data)) are defined. A document is clicked or dragged and dropped such that one of the memo annotation icon 508 and the label annotation 509 is selected, so that the annotation can be added to an image.

When a user selects the memo annotation icon 508, a memo annotation is added. The memo annotation is displayed when a corresponding document is opened, and may also be displayed in a thumbnail.

When the user selects the label annotation icon 509, a label annotation is added. The label annotation is displayed only in a thumbnail.

In the page view 506, a document corresponding to a page displayed in the thumbnail view 504 is rendered in a form having a memo annotation added thereto. When a page is switched in the thumbnail view 504, a page displayed in the page view 506 is also switched.

A status bar 507 is a standard status bar of the OS.

The annotation tool 505 may be formed of one annotation icon 511 as shown in FIG. 7.

After the annotation icon 511 is selected, the dialog box 512 for checking a type of annotation may be displayed as shown in FIG. 8 so that a type of an annotation to be pasted can be selected from the memo annotation and the label annotation.

The dialog box 512 is a standard dialog box of the OS.

A data table held in the database 103 will now be described with reference to FIGS. 9, 10, 11.

FIG. 9 is a diagram illustrating one example of a document table 601; FIG. 10 is a diagram illustrating one example of a thumbnail table 602; and FIG. 11 is a diagram illustrating one example of an annotation table 603.

As shown in FIG. 9, the document table 601 includes a document ID, a document name, a document type, and the number of pages.

A document ID is an ID which uniquely identifies a document in a cabinet.

A document name is a name added by a user from which a document content can be known.

A document type is information indicating whether a document is an application document or an image document.

The number of pages indicates the total number of image pages. In the case of an application document, the number of pages is not managed in the document table because management of the number of pages relies on an application.

As shown in FIG. 10, the thumbnail table 602 includes a thumbnail ID, a document ID, a page ID, and a thumbnail data.

A thumbnail ID is an ID which uniquely identifies a thumbnail image.

A document ID is an ID which uniquely identifies a document in a cabinet.

A page ID is an ID which indicates a sequential order of pages in a document.

Thumbnail data is a thumbnail image of a document, and data of an image file that is different for each thumbnail ID. A thumbnail image of an application document is created for only a first page thereof, and is thus always one. On the other hand, a thumbnail image of an image document is created for each page, and a thumbnail image for each page ID is stored in the table.

As shown in FIG. 11, the annotation table 603 includes an annotation ID, a document ID, a page ID, an annotation character string, an annotation type, and coordinates of annotation.

An annotation can be added to only an image document, and stored in association with any page in the image document. A document ID indicates a document in association with which an annotation is stored, and a page ID indicates a page in association with which an annotation is stored.

An annotation character string stores a character string included in an annotation.

An annotation type indicates whether an annotation is a memo annotation or a label annotation, and is stored as a flag form. In the case of a memo annotation, a picture image (document data) thereof is displayed in the page view 506. In the case of a label annotation, the annotation is displayed only when a list is displayed with thumbnail view.

Coordinates of annotation are coordinates indicating a position in which an annotation is pasted. For example, when the annotation is a rectangle, coordinates of the annotation are coordinates of the upper left corner and coordinates of the lower right corner of the rectangle.

The document table 601, the thumbnail table 602, and the annotation table 603 shown in FIGS. 9, 10 and 11 are not limited to the above structures and contents, and may have various structures and contents depending on applications and purposes.

A digitized document is stored in the document management application, and a thumbnail image of the document is automatically created by the document management application when the document is stored first.

A flow of processing in which a document is viewed using the document management system 1 will be described below with reference to FIGS. 12 and 13.

Figure 12:
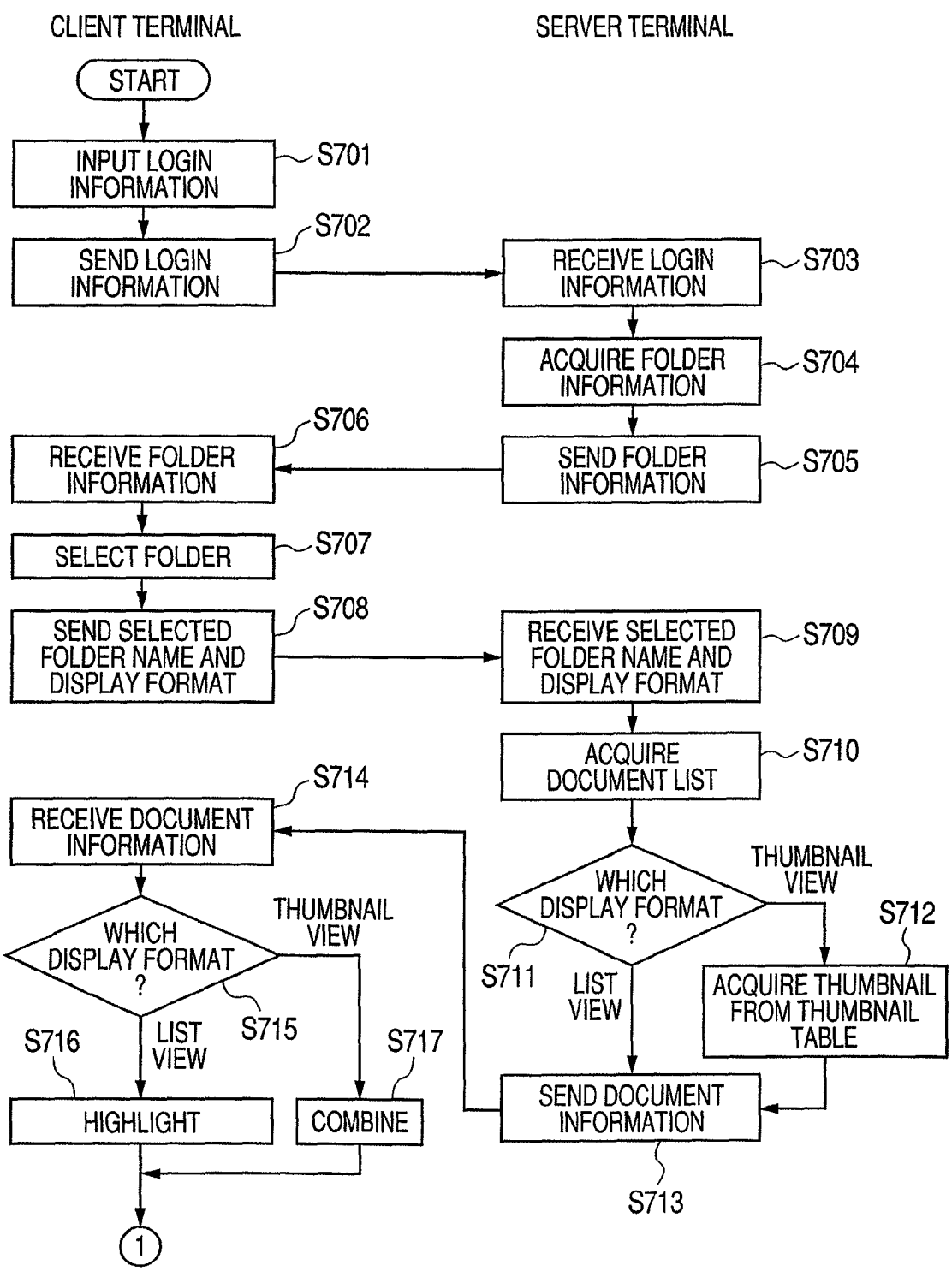
FIG. 12 is a flowchart of document display processing in the document management system 1.
Figure 13:
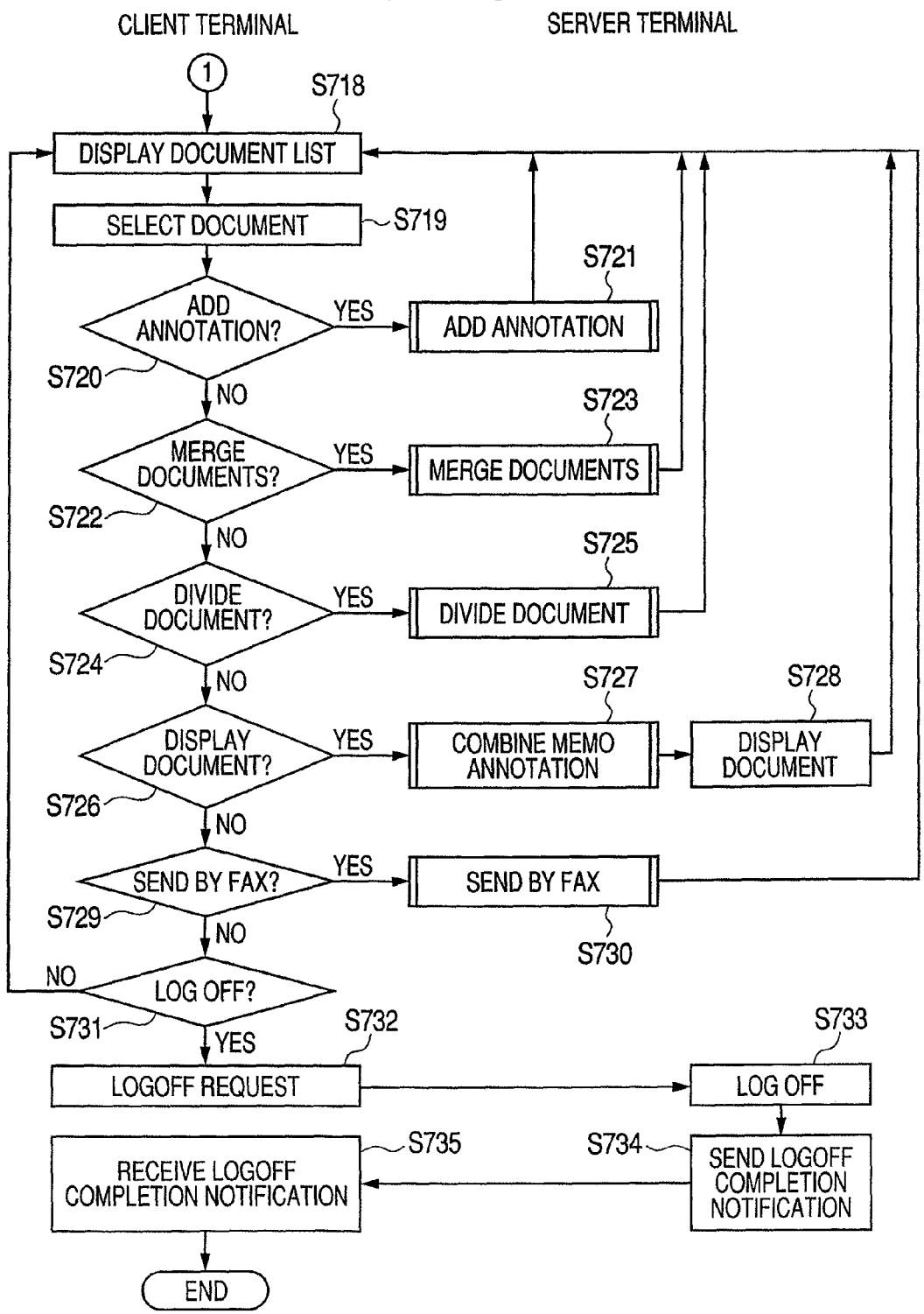
FIG. 13 is a flowchart of the document display processing in the document management system 1.

FIGS. 12 and 13 are flowcharts of document display processing in the document management system 1.

In FIGS. 12 and 13, the client terminal 101 acquires from the server terminal 102 one or more document information which includes at least a thumbnail image and document identification information which identifies a document data corresponding to the thumbnail image and includes first annotation data and/or second annotation data associated with the document identification information. If first annotation data is included in respective acquired document information, the client terminal 101 displays a thumbnail image with which the first annotation data is combined, as a list with thumbnail view on the display unit CRT 210. In addition, the client terminal 101 provides an interface for selecting a displayed thumbnail image. In addition, the client terminal 101 sends a document ID of a document data corresponding to a selected thumbnail image to the server terminal 102. Then, the server terminal 102 specifies the document data according to the document ID sent from the server terminal 102, and the client terminal 101 acquires the specified document data from the server terminal 102. If the second annotation data is included in the specified document data, the client terminal 101 individually displays the specified document data with which the second annotation data is combined, on the display unit CRT 210.

When a list with thumbnail view is displayed, the client terminal 101 identifies first annotation data to be combined with a thumbnail image, and combines the identified first annotation data with the thumbnail image. Further, the client terminal 101 sends the combined document data as facsimile data by fax through a facsimile driver. When specified document data is individually displayed, the client terminal 101 identifies second annotation data to be combined with the document data, and combines the identified second annotation data with the document data. When a list with list view is displayed, if first annotation data is included in respective document information, the client terminal 101 highlights that the first annotation data is included therein.

As shown in FIGS. 12 and 13, a user starts up the document management application by the client terminal 101, and then inputs login information for logging in a cabinet (S701). The input login information includes a selected cabinet name, a user name, and a password.

The client terminal 101 sends the login information to the server terminal 102 (step S702), and the server terminal 102 then receives the login information and performs authentication with respect to the cabinet (step S703).

If the login name and the password are valid as the result of the authentication, the server terminal 102 acquires folder information under the cabinet (step S704), and sends the acquired folder information from the server terminal 102 to the client terminal 101 (step S705).

The client terminal 101 receives the folder information, and displays a list of viewable folders in the repository display area 304 of the main window 301 (step S706).

When the user selects the optional folder 403 to view from the displayed folder list (step S707), the client terminal 101 sends the selected folder's name and information that represents a display format to the server terminal 102 (S708). The information of display format is setting information of the client terminal which is indicated by the button 404.

The server terminal 102 receives the selected Folder's name and the information of display format (step S709), and acquires document information of a document in the folder, and memo annotation information and label annotation information of the document from the database 103 to the memory of the server terminal 102 (step S710).

If the display format is thumbnail view (step S711), in addition to the acquired document information, memo annotation information, and label annotation information, the server terminal 102 acquires thumbnail information using a document ID as a key (step S712).

The server terminal 102 sends the acquired document information, memo annotation information, and label annotation information to the client terminal 101 (step S713). The server terminal 102 also sends the thumbnail information if the display format is thumbnail view.

The client terminal 101 receives the document information, the memo annotation information, the label annotation information, and the thumbnail information (step S714), and determines a display format of the client terminal 101 (S715).

If the display format is list view, the document to which the label annotation is attached is highlighted by changing a color or size of a character string of a name of the document, adding a mark, or the like (step S716). If the display format is thumbnail view, the label annotation is combined with respect to the document to which the label annotation is attached (step S717).

In combining, a position in which the label annotation is superimposed is a position indicated by the coordinates of annotation in consideration of a ratio of an original image size to a thumbnail size. If the display positions of the label annotation and the memo annotation do not overlap each other, the memo annotation may also be combined. On the other hand, if their display areas overlap each other, a mark or the like indicating that the memo annotation has been added may be added.

Although combining a thumbnail and an annotation is performed by the client terminal 101 in the present embodiment, it may be performed by the server terminal 102 so that the combined thumbnail data is received and displayed by the client terminal 101. In this configuration, if a content described in an annotation is to be displayed when a list with thumbnail view (display control) is displayed, coordinates of the added annotation on the thumbnail view is also received aside from an annotation character string. Then, for example, when a mouse is moved into a rectangle indicated by the received coordinates, the annotation character string may be displayed, for example, in a popup view. Alternatively, the annotation character string may be displayed in a dialog view.

The client terminal 101 displays a list of documents based on the acquired document information (step S718).

The client terminal 101 selects a document to operate from thumbnails of the displayed document list (document data selection) (step S719), and determines whether an "add annotation" menu item is selected or not in a state where the document is selected (step S720).

Figure 14:
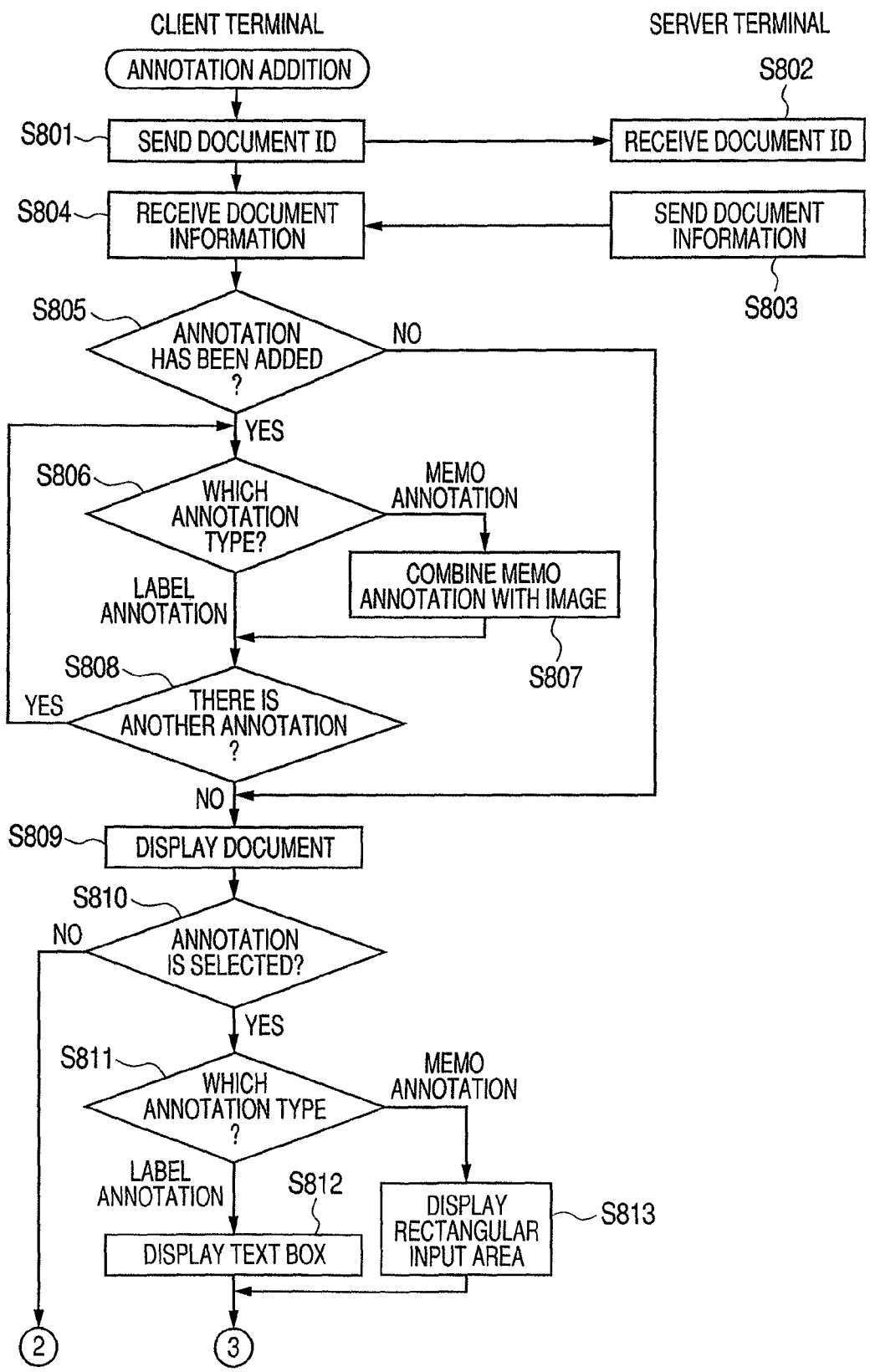
FIG. 14 is a flowchart of annotation adding processing in the document management system 1.
Figure 15:
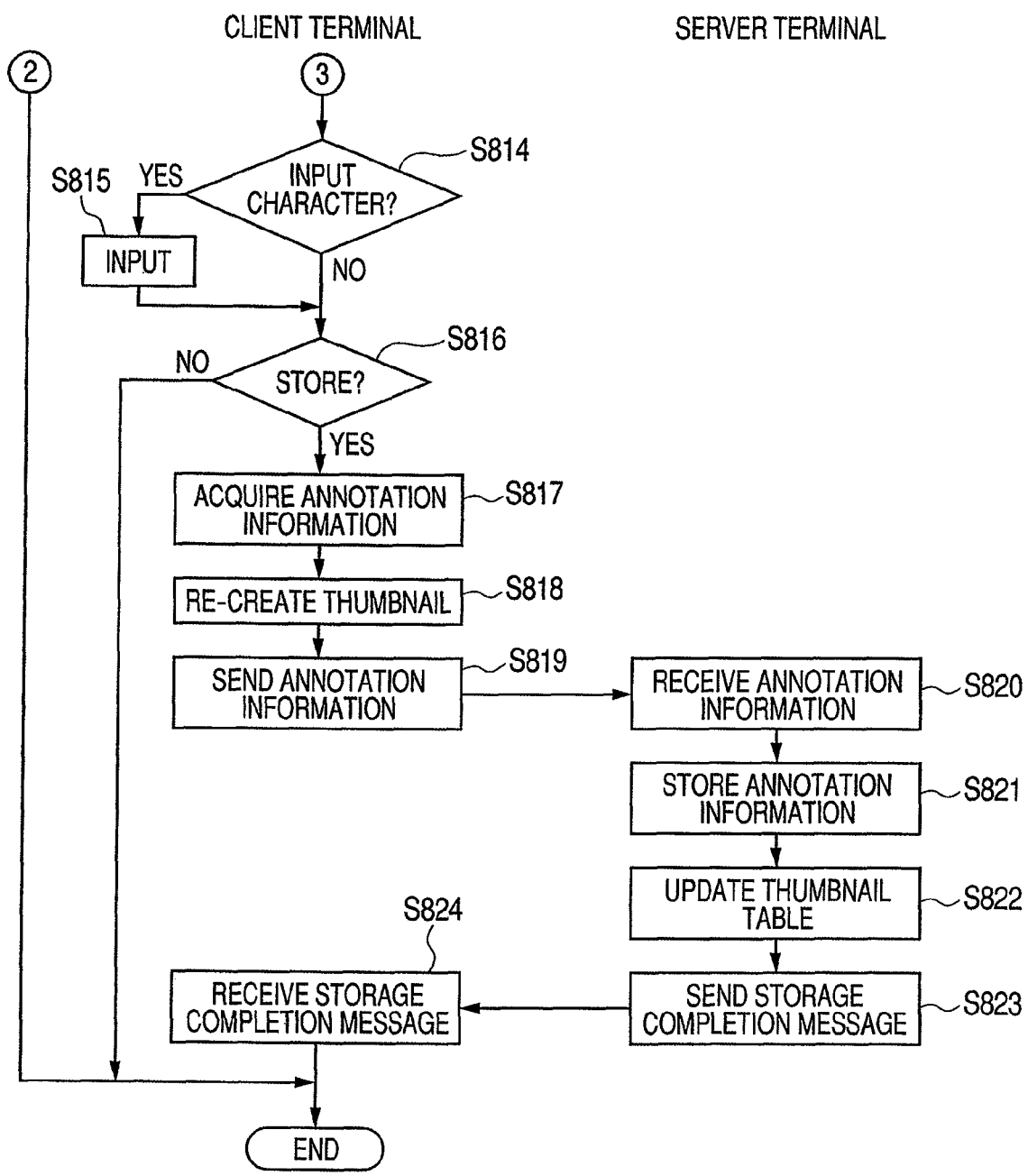
FIG. 15 is a flowchart of the annotation adding processing in the document management system 1.

If the annotation is to be added, the client terminal 101 performs annotation adding processing shown in FIGS. 14 and 15 (step S721), and returns to the document list display of step S718 after completing the annotation adding processing.

If the annotation is not to be added, the client terminal 101 determines whether a "merge documents" menu item is selected or not (step S718). If the documents are to be merged, the client terminal 101 performs document merging processing shown in FIG. 16 (step S723), and returns to the document list display of step S718 after completing the document merging processing.

If the documents are not to be merged, the client terminal 101 determines whether a "divide document" menu item is selected or not (step S724). If the document is to be divided, the client terminal 101 performs document dividing processing shown in FIG. 17 (step S725), and returns to the document list display of step S718 after completing the document dividing processing.

If the document is not to be divided, the client terminal 101 determines whether a "display document" menu item is selected or not (step S726). If the document is to be displayed, the client terminal 101 combines a memo annotation (step S727), and acquires the original of the selected document using the document ID of the document as a key (step S728). In this step, the client terminal 101 acquires the coordinate of the annotation from the acquired annotation information, and merges and displays the memo annotation with the original image. After that, the client terminal 101 returns to the document list display of step S718. It is noted that the memo annotation combining processing in step S727 corresponds to processing of step S805 to step S808 to be described with reference to FIG. 14.

When the document is displayed (display control of the document), a page to be displayed is identified (page identification), a memo annotation of the identified page is identified (annotation data identification), and the identified memo annotation is combined with the document and displayed.

If the document is not to be displayed (display control is not performed), the client terminal 101 determines whether a "send by fax" menu item is selected or not (step S729). If the "send by fax" menu item is selected, the client terminal 101 combines the separately managed memo annotation as an image with the original image of the document to be sent, and sends the combined image through a fax driver of the client terminal 101 by the fax 105 (step S730). A label annotation is not added to the image to be sent.

Such fax transmission may be performed through a fax driver of the server terminal 102.

The client terminal 101 determines whether or not there is a request for logoff (disconnection) from the connecting cabinet (step S732), and if there is no logoff request from the user, returns to the document list display of step S715.

If there is a logoff request, the client terminal 101 makes a logoff request to the server terminal 102 (step S732), and the server terminal 102 performs logoff processing (step S733). Then, the server terminal 102 sends a logoff completion notification to the client terminal 101 (step S734). The client terminal 101 receives the logoff completion notification (step S735), and then completes the process.

The annotation adding processing of step S721 of FIG. 13 will be described in detail with reference to FIGS. 14, 15, 18, 19, 20 and 21.

Figure 18:
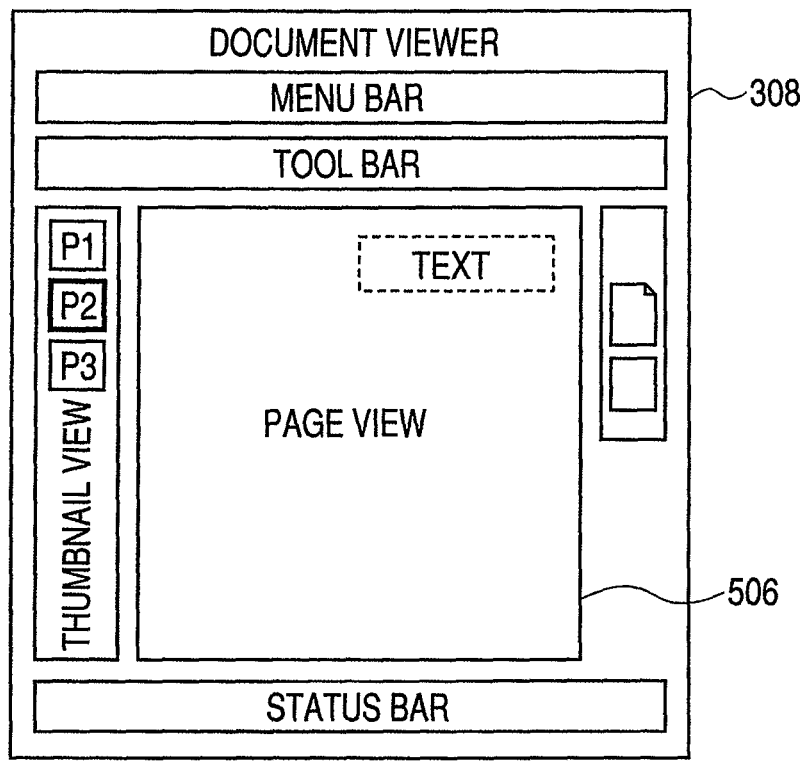
FIG. 18 is a diagram illustrating one example of a label annotation pasted on a page view 506 of the document viewer 308.
Figure 19:
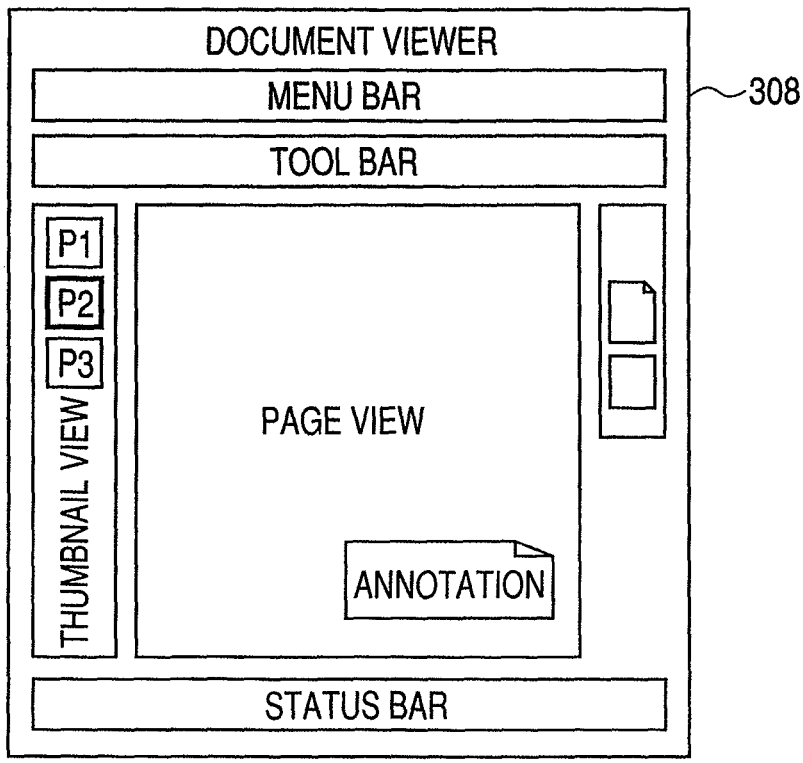
FIG. 19 is a diagram illustrating one example of a memo annotation pasted on the page view 506 of the document viewer 308.

FIG. 14 is a flowchart of the annotation adding processing in the document management system 1; FIG. 15 is a flowchart of the annotation adding processing in the document management system 1; FIG. 18 is a diagram illustrating one example of a label annotation pasted on the page view 506 of the document viewer 308; FIG. 19 is a diagram illustrating one example of a memo annotation pasted on the page view 506 of the document viewer 308; FIG. 20 is a diagram illustrating one example of the annotation table 603 which is stored in the RAM 203 of the client terminal 101; and FIG. 21 is a diagram illustrating one example of the annotation table 603 of the server terminal 102 in which information is updated by the annotation adding processing.

In FIGS. 14 and 15, the client terminal 101 adds first annotation data and/or second annotation data to document data.

As shown in FIGS. 14 and 15, the client terminal 101 sends a document ID of a document to be operated which is selected from thumbnails of a displayed document list, to the server terminal 102 (step S801).

The server terminal 102 receives the document ID (step S802), acquires document information of a corresponding document (data including a document image to be displayed) and annotation information from the document table 601, and sends the acquired document information and annotation information to the client terminal 101 (step S803).

The client terminal 101 acquires the document information sent from the server terminal (step S804), and determines whether or not an annotation has been added to the document (step S805).

Whether or not an annotation has been added to the document is determined depending on whether or not there is annotation information corresponding to a document ID of the selected document. The document ID of the selected document is identified with reference to the document table 601. Whether or not there is annotation information corresponding to the document ID of the selected document is determined with reference to the annotation table 603. For example, in the example shown in FIG. 21, if the document ID of the selected document is "00002", annotations of annotation IDs "00001" and "00002" have been added to the document.

If an annotation has been added, a type of the annotation is determined according to the identified annotation ID (step S806).

If the type of the annotation is label annotation (second annotation data is identified), the annotation is not displayed in the page view 506 in the main window 308.

If the type of the annotation is memo annotation, the memo annotation is combined with an image of the specified document (step S807).

A memo annotation is added to each page of the document. Therefore, to display the document in step S809, a memo annotation to be added is identified and combined with the document's image for each page displayed in the page view.

Specifically, after the document ID is sent in step S801 and document information (including an image of the document) corresponding to the document ID is acquired, a document of the first page is displayed at first. A memo annotation added to a document of the first page (corresponding to a page ID) is identified, and the memo annotation is combined with (superimposed on) the document and displayed.

When the second page is displayed after the first page is displayed, a memo annotation having a page ID of the second page is also identified, and the memo annotation is combined with (superimposed on) a document of the second page and displayed.

The client terminal 101 determines whether or not there is another annotation (step S808). If there is another annotation, the client terminal 101 returns to step S806 and determines a type of the annotation.

If there is no other annotation, the client terminal 101 displays the document on which the annotation (memo annotation (second annotation data)) is superimposed in the document viewer 308 (step S809). The client terminal 101 acquires coordinates of the annotation in the annotation table 603, and superimposes on the position of the coordinates. For example, if an annotation ID is "00001", the coordinates of the annotation are "(100, 100), (300, 200)" as shown in FIG. 21. In this case, the origin point of a rectangle to be superimposed is at a distance of 100 in a horizontal and vertical directions from the upper left corner of the document's image, and the rectangle has a horizontal length of 200 (=300−100) and a vertical length of 100 (=200−100).

The client terminal 101 determines whether an annotation (annotation data) is selected or not using the annotation tool 505 in the main window 308 (step S810). If an annotation is selected, the client terminal 101 determines a type of the selected annotation (step S811). If the type is label annotation, the client terminal 101 adds and displays a text box for prompting text input onto the page view 506 of the document viewer 308 as shown in FIG. 18 (step S813) (adding of annotation data).

Although the text box is displayed on the upper part of the page view 506, a pasting position on a thumbnail is always in a first page, and is automatically adjusted. For example, in an automatic adjustment method, coordinates of pasting on a thumbnail are adjusted such that annotations do not overlap each other. In a case where there are so many annotations that the annotations overlap each other, an annotation which is added temporally later is adjusted to be overlaid as a foreground. A character string to be displayed is stored, which is large-sized so that the characters are legible even in thumbnail view.

A memo annotation (second annotation data) can be added to each page of a document.

On the other hand, a memo annotation is selected by the annotation tool 505 in the main window 308, the client terminal 101 pastes (adds) a rectangle of the memo annotation onto an area specified on the page view 506 of the document viewer 308 as shown in FIG. 19, and prompts the user to input a character string to be included in the annotation (step S813). The character string is displayed with a size specified by the client terminal 101 (adding of annotation data).

Although the annotation tool has two types of annotation in the above description, the annotation tool may be configured to have additional types of annotation, for example, an annotation which draws figures such as a circle and an ellipse, and a stamp format annotation (e.g., an encircled kanji character that represents a secret, which is added to a confidential document).

The client terminal 101 determines whether character input into the annotation is performed or not (step S814). If character input is performed, the user inputs characters into an annotation area of label annotation or memo annotation displayed in the page view 506 of the document viewer 308, using a keyboard or the like (step S815). The client terminal 101 temporarily stores the input annotation information in the RAM 203 of the client terminal 101 (step S816). Its storage format is the same format as of the annotation table 603.

The client terminal 101 determines whether or not to store the document (step S816). If the document is not to be stored, update in the client terminal 101 is discarded and the annotation adding processing is terminated.

If the document is to be stored, client terminal 101 acquires the annotation information temporarily stored in the RAM 203 (step S817), re-creates a thumbnail (step S818), and sends the acquired information from the client terminal 101 to the server terminal 102 (step S819).

The server terminal 102 receives the annotation information from the client terminal 101 (step S820), stores the edited information of the annotation to update the existing database therewith (step S821).

For example, annotation information shown in FIG. 20 (which has been temporarily stored in the RAM 203 of the client terminal 101) is reflected as a fourth record shown in FIG. 21 in the annotation table 603 of the server terminal 102.

The server terminal 102 deletes the thumbnail of the target document to be updated, from the thumbnail table 602 of the database 103, acquires updated annotation information of the document from the annotation table 603, re-creates a thumbnail image by superimposing the annotation information on the image, and stores the latest thumbnail image in the thumbnail table 602 (step S822).

When the storage processing is completed, the server terminal 102 sends a storage completion message to the client terminal 101 (step S823).

The client terminal 101 receives the storage completion message (step S824), and completes the flow of the annotation adding processing.

A flow of processing of merging documents by the document management system 1 will now be described with reference to FIGS. 16, 22, 23, 24 and 25.

Figure 16:
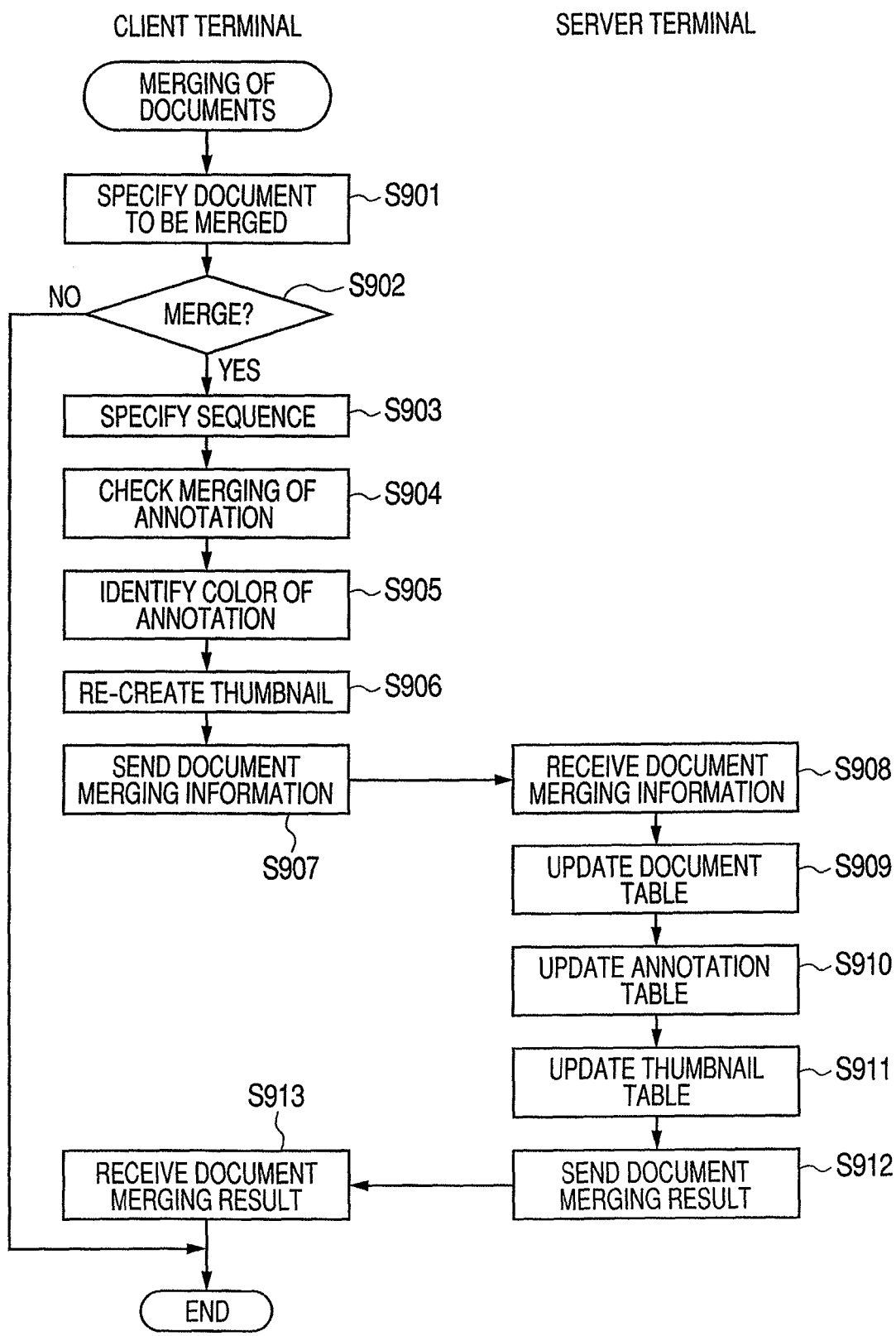
FIG. 16 is a flowchart of document merging processing in the document management system 1.
Figures 25, 26, 27:
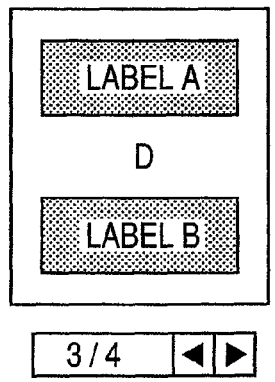
FIG. 25 is a diagram illustrating one example of the annotation table 603 of annotations added to merged documents.
FIG. 26 is a diagram illustrating one example of a document D before division of the document.
FIG. 27 is a diagram illustrating one example of the document table 601 before the division of the document.

FIG. 16 is a flowchart of document merging processing in the document management system 1; FIG. 22 is a diagram illustrating one example of annotations added to documents to be merged; FIG. 23 is a diagram illustrating one example of the annotation table 603 of annotations added to documents to be merged; FIG. 24 is a diagram illustrating one example of annotations added to merged documents; and FIG. 25 is a diagram illustrating one example of the annotation table 603 of annotations added to merged documents.

In FIG. 16, the client terminal 101 merges a plurality of document data into one document data, and selectively merges first annotation data and/or second annotation data which has been added to the document data before being merged, thereby creating a thumbnail image which is the merged document data that is combined with the merged first annotation data and/or second annotation data. In addition, the client terminal 101 determines a color of the first annotation data and/or second annotation data after being merged.

As shown in FIG. 16, in addition to a selected document to be operated, a user specifies a document to be merged, from thumbnails of a displayed document list in the main window 301 of the client terminal 101 (step S901).

A document to be merged can be specified on thumbnail view of documents in the document display area 305 or can be specified on list view of the documents.

The client terminal 101 gives instruction to merge documents (document data merging instruction) in a state where a document to be merged is selected (step S902). A document data merging instruction can be given by selecting a "document merging" menu item in the menu bar 302 of the main window 301. Alternatively, a popup menu through which document merging can be started may be implemented.

If documents are not to be merged, the processing is terminated.

The client terminal 101 handles a process for a user to specify a sequence of merged documents (step S903). In an example of a method for specifying a sequence, documents to be merged is displayed with list view, and a button for changing a sequence in the list is added, so that the sequence of the documents after being merged can be changed.

The client terminal 101 checks whether or not an annotation that has already been added to a document is merged at the same time as document merging processing (step S904). If an annotation is undesirable to be reflected in merged documents, it is specified that the annotation is not to be merged in this processing, and the annotation is thereby deleted.

The client terminal 101 determines a background color of an annotation to be merged (color determination) such that which document being merged the annotation was added to can be determined (identified) (step S905).

Color information is held in advance corresponding to the number of document to be merged. For example, yellow color information and blue color information are held corresponding to two documents. When there are two IDs of documents to be merged, annotation information added to one document ID is set to yellow, and annotation information added to the other document ID is set to blue. Thereby, it can be determined which document an annotation was added to when an image document or a thumbnail is viewed after the merging.

For example, as shown in FIGS. 22 and 23, if a document B and a document C to which label annotations are added respectively are merged, a thumbnail like a document B' is created as shown in FIG. 24 after the merging. In this case, annotations are created according to the set color information and the thumbnail is then created (document data merging).

The client terminal 101 deletes the thumbnail before the merging, and stores the thumbnail after the merging in the thumbnail table 602 of the client terminal 101 (step S906). Then, the client terminal 101 sends merging information of the documents edited by the client terminal to the server terminal 102 (step S907). The merging information includes a document ID indicating a document about which a merging instruction is given by the client terminal 101, a document table, an annotation table, and a thumbnail image.

The server terminal 102 receives the merging information of the document (step S908), and merges document records of the merged documents edited by the client terminal 101 into one record (step S909).

The server terminal 102 updates a record of the annotation specified as a merged target (step S910). Thereby, a record of a document ID of a document specified as a top by sequence specifying processing remains, the number of pages after the merging are summed up, and the record is stored in the database. On the other hand, a record of a document ID of a document which is not specified as a top by the sequence specifying processing, is deleted.

If the annotation type is memo annotation, the server terminal 102 stores an annotation in a page to which the annotation is added before the merging. On the other hand, if the annotation type is label annotation, the annotation is stored as a label annotation even in the document after being merged, and stored in the top page of a thumbnail.

The server terminal 102 updates the thumbnail table with the thumbnail image after the merging (step S911), and sends the document merging result to the client terminal 101 (step S912). As a document merging result, a thumbnail image may be sent when it is merged, or a message that merging is done may be sent.

When the thumbnail table is updated, the client terminal 101 receives the merging result, and displays the thumbnail as the merging result in the document display area 305.

Although two documents are merged into one document in the above embodiment of the present invention, two or more documents may be specified as document to be merged, so that many number of documents can be merged by a single operation.

Figure 17:
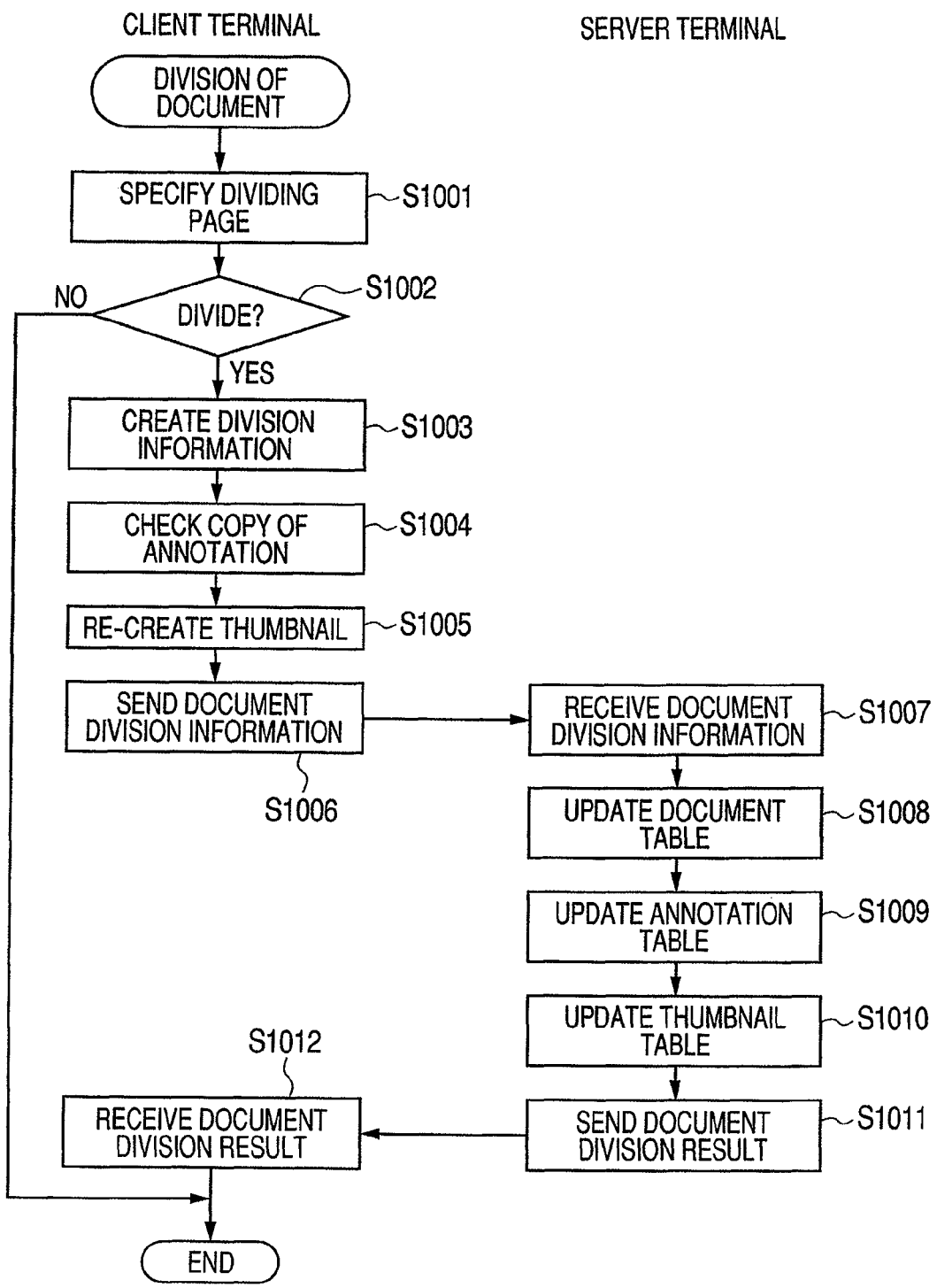
FIG. 17 is a flowchart of document dividing processing in the document management system 1.
Figures 28, 29, 30:
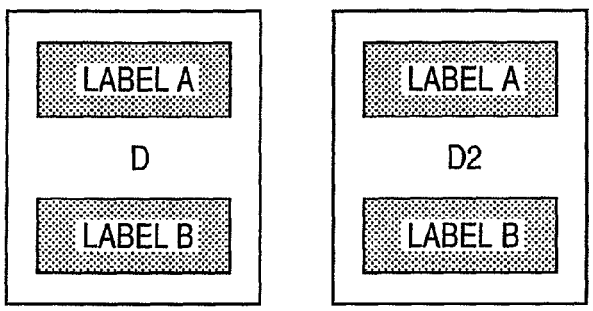
FIG. 28 is a diagram illustrating one example of the annotation table 603 before the division of the document.
FIG. 29 is a diagram illustrating one example of documents D, D2 after the division of the document.
FIG. 30 is a diagram illustrating one example of the document table 601 after the division of the document.

A flow of processing of dividing a document will now be described with reference to FIGS. 17, 26, 27, 28, 29, 30 and 31. FIG. 17 is a flowchart of document dividing processing in the document management system 1; FIG. 26 is a diagram illustrating one example of a document D before division of the document; FIG. 27 is a diagram illustrating one example of the document table 601 before the division of the document; FIG. 28 is a diagram illustrating one example of the annotation table 603 before the division of the document; FIG. 29 is a diagram illustrating one example of documents D, D2 after the division of the document; FIG. 30 is a diagram illustrating one example of the document table 601 after the division of the document; and FIG. 31 is a diagram illustrating one example of the annotation table 603 after the division of the document.

In FIG. 17, the client terminal 101 divides one document data, and copies first annotation data and/or second annotation data which has been added to the document data before being divided, into document data after being divided (annotation data copy), thereby creating a thumbnail image which is the divided document data that is combined with the first annotation data and/or second annotation data.

As shown in FIG. 17, a user specifies a page to be divided using an arrow for page turning of a document selected from thumbnails of a displayed document list in the main window 301 of the client terminal 101 (step S1001).

When the user gives an instruction to divide the document (document data division instruction) (step S1002), division information is created in the RAM 203 of the client terminal (step S1003). The document division instruction can be given by selecting a "document division" menu item in the menu bar 302 of the main window 301. Alternatively, a popup menu through which document division can be started may be implemented.

A divided document is stored as a new document in a table. The storage format of division information is the same format as of the document table 601 and the annotation table 603.

The client terminal 101 checks whether or not an annotation associated with the document before being divided is copied into two divided documents (step S1004). If the annotation is not to be copied into the divided documents, the annotation is deleted.

The client terminal 101 re-creates a thumbnail (generates a thumbnail image) based on the specified division information (step S1005), and sends the division information of the document to the server terminal 102 (step S1006) (document data division).

Division information is information of a document ID indicating a divided document, and a document table, an annotation table, and a thumbnail table after division.

The server terminal 102 receives the division information (step S1007), and updates the document table based on document table information stored in the division information (step S1008). The server terminal 102 copies a record of a divided document ID as a new record in the document table 601, and updates the number of pages after the division.

If an exiting annotation is added to a divided document, the server terminal 102 copies a record associated with a document ID before the division and stores a document ID after the division in a document ID thereof (step S1009). With respect to a page ID, an annotation character string, an annotation type, and coordinates of annotation, the same information as the exiting record is stored.

The server terminal 102 updates a thumbnail corresponding to the document before being divided, to a new thumbnail re-created by the client terminal 101 (step S1010). The thumbnail table 602 for a document newly created after division is created as a new record.

For example, as shown in FIG. 26, there is a document D to which annotation labels A and B is added before the division, and the document D is supposed to be divided at the third page. At this time, the document table 601 is as shown in FIG. 27, and the annotation table 603 is as shown in FIG. 28. After that, the document D is divided into a document D and a document D2 each of which retains the label A and the label B as shown in FIG. 29. At this time, the document table 601 is as shown in FIG. 30, and the annotation table 603 is as shown in FIG. 31.

The server terminal 102 sends the division result of the document to the client terminal 101 (step S1011). When the client terminal 101 receives the division result of the document (step S1012), the processing is completed.

Processing of changing attributes of memo annotation and label annotation after an annotation is added to a document and stored will be described with reference to FIGS. 32 to 35.

Figure 32:
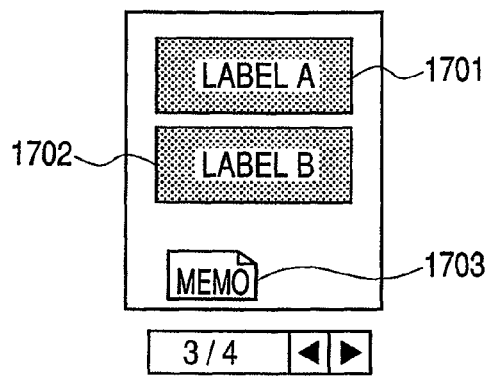
FIG. 32 is a diagram illustrating one example of display in a case where a document having an annotation added thereto is selected in the document display area 305.
Figure 33:
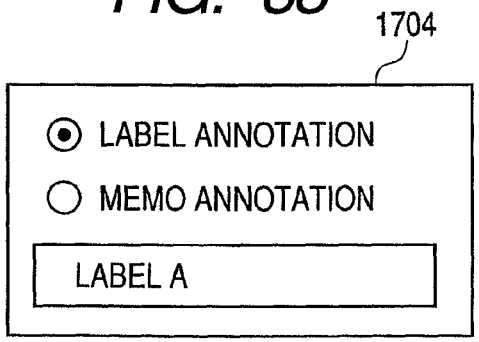
FIG. 33 is a diagram illustrating one example of display of annotation attribute information 1704 in a case where a label annotation 1701 is selected.
Figure 34:
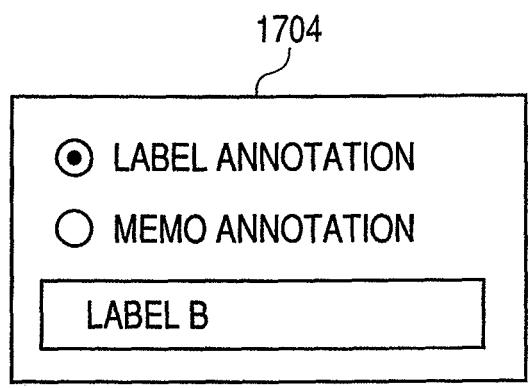
FIG. 34 is a diagram illustrating one example of display of the annotation attribute information 1704 in a case where a label annotation 1702 is selected.
Figure 35:
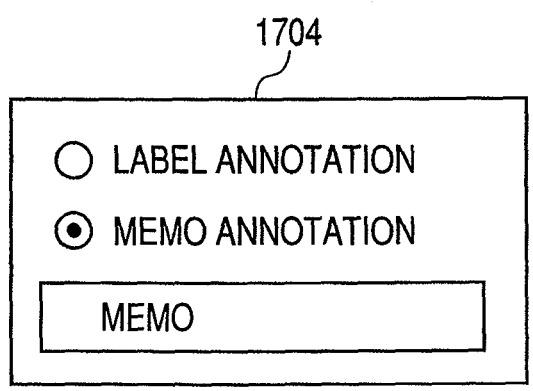
FIG. 35 is a diagram illustrating one example of display of the annotation attribute information 1704 in a case where a memo annotation 1703 is selected.

FIG. 32 is a diagram illustrating one example of display in a case where a document having an annotation added thereto is selected in the document display area 305; FIG. 33 is a diagram illustrating one example of display of an annotation attribute information 1704 in a case where a label annotation 1701 is selected; FIG. 34 is a diagram illustrating one example of display of the annotation attribute information 1704 in a case where a label annotation 1702 is selected; and FIG. 35 is a diagram illustrating one example of display of the annotation attribute information 1704 in a case where a memo annotation 1703 is selected.

It is assumed here that a document to which an annotation is added is displayed as a thumbnail image in the document display area 305 of the main window 308 as shown in FIG. 32. When a user selects the document, a dialogue balloon is displayed for each annotation added to the document, and annotation attribute information 1704 which indicates an attribute and an annotation character string of each annotation is displayed. FIG. 33 illustrates annotation attribute information 1704 about label annotation of the label annotation 1701. FIG. 34 illustrates annotation attribute information 1704 about label annotation of the label annotation 1702. FIG. 35 illustrates annotation attribute information 1704 about memo annotation of the memo annotation 1703.

A case will be described in which attributes of memo annotation and label annotation need to be changed after an annotation is added to a document and stored. For example, to change the already added label annotation 1702 to the memo annotation, a radio button of memo annotation is selected. To change a character string displayed in annotation, a character string is input into a text box of the annotation attribute information 1704.

The embodiment of the present invention has been described above. Alternatively, in a case where operation such as document merging and document division is performed when the document display area 305 is displayed, operation such as document merging and document division is performed in a state where a document is opened on the document viewer 308.

The embodiment of the present invention has been described using a client-server type environment. Alternatively, in an environment using a Web application, display of a client terminal is controlled using a browser, and client-side processing is controlled by, for example, sending display data (HTML data) in which JavaScript or the like is described. Or, display and processing by a browser is controlled by a program for advance processing which is downloaded as required.

As described above, according to the embodiment of the present invention, the document management system is provided which allows a document to be easily checked and improves operating efficiency.

Particularly, there are provided two types of annotations: an annotation for dealing (memo annotation) which prompts checking including instruction to a business customer and reference information and an annotation (label annotation)

which is checked by an operator and intended to improve operational efficiencies. Of the two types, only the label annotation is displayed in thumbnail view. Accordingly, a user can know the level of importance of a document even in a list display with thumbnail view so that the speed of processing important documents can be improved. In other words, when a user views documents stored in the document management system, the user can determine a document which should be processed in preference based on a label annotation, in thumbnail view without opening the document. In addition, a document which should be processed in preference can be determined quickly.

Further, a label annotation, which is an unnecessary annotation for a destination of a document, is not added to a document when the document is sent by fax. Therefore, an effort to manually remove unnecessary annotations before a document is sent can be omitted.

Further, an annotation character string included in a label annotation can be displayed using a large font in thumbnail view.

While the exemplary embodiment of the document management system of the present invention has been described with reference to the accompanying drawings, the present invention is not limited to the above described embodiment. It is understood by those skilled in the art that various changes and modifications can be made and fall within the spirit and scope of the invention as defined by the claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-066201 filled Mar. 14, 2008, which is hereby incorporated by reference herein in its entirety.

What is claimed is:

1. An information processor which displays a thumbnail image of a document, the information processor comprising:
   a document selecting unit configured to select one of a plurality documents;
   a setting unit configured to set a first type to a first annotation and to set a second type to a second annotation, wherein the first type indicates that the first annotation is displayed with a thumbnail image of the selected document and the second type indicates that the second annotation is displayed with a page image of the selected document;
   a selecting unit configured to select the thumbnail image or the page image as a display target; and
   a display unit configured to display an image and an annotation, wherein the display unit switches the annotation to be displayed based on the display target selected by the selecting unit,
   wherein the display unit displays the thumbnail image of the selected document with the first annotation of the first type being combined with the thumbnail image in a case where the thumbnail image is selected by the selecting unit, and displays the page image of the selected document with the second annotation of the second type being combined with the page image in a case where the page image is selected by the selecting unit,
   wherein, when an instruction is accepted that instructs merging of a first one of the plurality of documents to which a first document annotation is set and a second one of the plurality of documents to which a second document annotation is set, the display unit displays, as the thumbnail image of a document formed by merging the first and second documents, a thumbnail image including an image of the first document and the first and second document annotations, and when the first and second document annotations on the displayed thumbnail image overlap with each other, the display unit displays a thumbnail image including the image of the first document, the first document annotation and the second document annotation which is changed in position so as not to overlap with the first document annotation, and
   wherein at least one hardware processor executes process steps stored in a memory to function as at least one of the units.

2. The information processor according to claim 1, further comprising:
   a document division instruction unit configured to instruct to divide a document;
   a document dividing unit configured to divide the document instructed to be divided;
   an annotation copying unit configured to copy an annotation added to the document to be divided, into each division of the divided document; and
   a thumbnail image generating unit configured to generate a thumbnail image of the divided document,
   wherein the display unit displays the first annotation among the copied annotations and wherein the first annotation is combined with each of the generated thumbnail images.

3. The information processor according to claim 1, further comprising a color determination unit configured to determine color of the first annotation for each of the document data merged so that the display unit displays the first document annotation and the second document annotation in a manner to be identifiable by color.

4. The information processor according to claim 1, wherein the display unit displays a list of the documents with list view, and further comprises a display mode switching unit configured to switch between view of the thumbnail image and the list view.

5. The information processor according to claim 1, wherein the document and the thumbnail image corresponding to the document are stored in a storage unit of a server apparatus connected to the information processor through a network, and wherein the information processor further comprises an acquisition unit configured to acquire the document and the thumbnail image from the server apparatus according to an instruction of a user.

6. The information processor according to claim 1, wherein the display unit is configured to switch between display of a thumbnail view in which the thumbnail image of the selected document is displayed, and display of a page view in which the page image of the selected document is displayed, and
   wherein in a case where the display unit displays the selected document in the thumbnail view, the thumbnail image of the selected document is displayed in combination with the first annotation of the first type, and in a case where the display unit displays the selected document in the page view, the page image of the selected document is displayed in combination with the second annotation of the second type.

7. A document management system which includes a server apparatus and an information processor that are communicably connected, the server apparatus comprising:
   a holding unit configured to hold a plurality of documents, and for each document, a thumbnail image of the document, a first annotation to be combined with the thumbnail image, and a second annotation to be combined with the document, and the information processor comprising:

a document selecting unit configured to select one of the plurality of documents;

an acquisition unit configured to acquire the selected document together with the thumbnail image and the first and second annotations for the selected document from the server apparatus;

a setting unit configured to set a first type to the first annotation and to set a second type to the second annotation, wherein the first type indicates that the first annotation is displayed with a thumbnail image of the acquired document and the second type indicates that the second annotation is displayed with a page image of the acquired document;

a selecting unit configured to select the thumbnail image or the page image as a display target; and a display unit configured to display an image and an annotation, wherein the display unit switches the annotation to be displayed based on the display target selected by the selecting unit, wherein the display unit displays the thumbnail image of the acquired document with the first annotation of the first type being combined with the thumbnail image in a case where the thumbnail image is selected by the selecting unit, and displays the page image of the acquired document with the second annotation of the second type being combined with the page image in a case where the page image is selected by the selecting unit, and wherein, when an instruction is accepted that instructs merging of a first one of the plurality of documents to which a first document annotation is set and a second one of the plurality of documents to which a second document annotation is set, the display unit displays, as the thumbnail image of a document formed by merging the first and second documents, a thumbnail image including an image of the first document and the first and second document annotations, and when the first and second document annotations overlap with each other, the display unit displays a thumbnail image including the image of the first document, the first document annotation and the second document annotation which is changed in position so as not to overlap with the first document annotation.

8. The system according to claim 7, wherein the display unit is configured to switch between display of a thumbnail view in which the thumbnail image of the selected document is displayed, and display of a page view in which the page image of the selected document is displayed, and wherein in a case where the display unit displays the selected document in the thumbnail view, the thumbnail image of the selected document is displayed in combination with the first annotation of the first type, and in a case where the display unit displays the selected document in the page view, the page image of the selected document is displayed in combination with the second annotation of the second type.

9. A processing method executed by an information processor which displays a thumbnail image of a document, comprising:

selecting one of a plurality of documents according to an instruction of a user;

setting a first type to a first annotation and setting a second type to a second annotation, wherein the first type indicates that the first annotation is displayed with a thumbnail image of the selected document and the second type indicates that the second annotation is displayed with a page image of the selected document;

selecting the thumbnail image or the page image as a display target; and displaying an image and an annotation, wherein the displaying step switches the annotation to be displayed based on the selected display target, wherein, the displaying step displays the thumbnail image of the selected document with the first annotation of the first type being combined with the thumbnail image in a case where the thumbnail image is selected as the display target, and displays the page image of the selected document with the second annotation of the second type being combined with the page image in a case where the page image is selected as the display target, and wherein, when an instruction is accepted that instructs merging of a first one of the plurality of documents to which a first document annotation is set and a second one of the plurality of documents to which a second document annotation is set, the displaying step displays, as the thumbnail image of a document formed by merging the first and second documents, a thumbnail image including an image of the first document and the first and second document annotations, and when the first and second document annotations on the displayed thumbnail image overlap with each other, the displaying step displays a thumbnail image including the image of the first document, the first document annotation and the second document annotation which is changed in position so as not to overlap with the first document annotation.

10. The method according to claim 9, further comprising switching between display of a thumbnail view in which the thumbnail image of the selected document is displayed, and display of a page view in which the page image of the selected document is displayed, wherein in a case where the selected document is displayed in the thumbnail view, the thumbnail image of the selected document is displayed in combination with the first annotation of the first type, and in a case where the selected document is displayed in the page view, the page image of the selected document is displayed in combination with the second annotation of the second type.

11. A non-transitory computer readable storage medium storing a computer program causing a computer to execute the method of claim 9.

12. An information processor comprising:

a change unit configured to, when an instruction is accepted that instructs merging of a first document to which a first document annotation is set and a second document to which a second document annotation is set, and when the first and second document annotations overlap with each other, change the position of the second document annotation such that the first and second document annotations do not overlap with each other; and a display unit configured to display, for a document formed by merging the first and second documents, a thumbnail image including an image of the first document and the first and second document annotations, wherein, when the first and second document annotations on the displayed thumbnail image overlap with each other, the display unit displays a thumbnail image including the image of the first document, the first document annotation and the second document annotation with the position changed by the change unit,
wherein at least one hardware processor executes process steps stored in a memory to function as at least one of the units.

13. A processing method executed by an information processor comprising:
   changing, when an instruction is accepted that instructs merging of a first document to which a first document annotation is set and a second document to which a second document annotation is set, and when the first and second document annotations overlap with each other, the position of the second document annotation such that the first and second document annotations do not overlap with each other; and
   displaying, for a document formed by merging the first and second documents, a thumbnail image including an image of the first document and the first and second document annotations, wherein, when the first and second document annotations on the displayed thumbnail image overlap with each other, the displaying step displays a thumbnail image including the image of the first document, the first document annotation and the second document annotation with the position changed in the changing step.

14. A non-transitory computer readable storage medium storing a computer program causing a computer to execute a method comprising:
   changing, when an instruction is accepted that instructs merging of a first document to which a first document annotation is set and a second document to which a second document annotation is set, and when the first and second document annotations overlap with each other, the position of the second document annotation such that the first and second document annotations do not overlap with each other; and
   displaying, for a document formed by merging the first and second documents, a thumbnail image including an image of the first document and the first and second document annotations, wherein, when the first and second document annotations on the displayed thumbnail image overlap with each other, the display step displays a thumbnail image including the image of the first document, the first document annotation and the second document annotation with the position changed in the changing step.

* * * * *